(12) United States Patent
Fang et al.

(10) Patent No.: US 10,669,827 B2
(45) Date of Patent: Jun. 2, 2020

(54) RECYCLING $CO_2$ IN HEAVY OIL OR BITUMEN PRODUCTION

(75) Inventors: Windsong Fang, Houston, TX (US); Thomas J. Wheeler, Houston, TX (US)

(73) Assignee: ConocoPhilips Company, Houston, TX (US)

( * ) Notice: Subject to any disclaimer, the term of this patent is extended or adjusted under 35 U.S.C. 154(b) by 241 days.

(21) Appl. No.: 13/525,488

(22) Filed: Jun. 18, 2012

(65) Prior Publication Data

US 2013/0000897 A1    Jan. 3, 2013

Related U.S. Application Data

(60) Provisional application No. 61/502,165, filed on Jun. 28, 2011.

(51) Int. Cl.
| | |
|---|---|
| *E21B 43/16* | (2006.01) |
| *E21B 43/30* | (2006.01) |
| *E21B 43/24* | (2006.01) |

(52) U.S. Cl.
CPC ........ *E21B 43/164* (2013.01); *E21B 43/2408* (2013.01); *E21B 43/305* (2013.01); *Y02P 90/70* (2015.11)

(58) Field of Classification Search
CPC ...... E21B 43/164; E21B 43/168; E21B 43/24; E21B 43/2406; E21B 43/2408; E21B 43/255; E21B 43/281; E21B 43/30; E21B 41/0064
See application file for complete search history.

(56) References Cited

U.S. PATENT DOCUMENTS

| | | | |
|---|---|---|---|
| 3,674,092 A | * | 7/1972 | Bandyopadhyay ........................ E21B 43/2405 166/269 |
| 3,871,451 A | * | 3/1975 | Brown .................. E21B 43/164 166/267 |
| 3,872,924 A | | 3/1975 | Clampitt |
| 4,212,354 A | | 7/1980 | Guinn |
| 4,217,956 A | | 8/1980 | Goss et al. |
| 4,321,966 A | * | 3/1982 | Traverse et al. ............... 166/245 |

(Continued)

FOREIGN PATENT DOCUMENTS

| | | | |
|---|---|---|---|
| CA | 1059432 | | 7/1979 |
| CA | 2281276 | * | 2/2001 |

(Continued)

OTHER PUBLICATIONS (PCT/US2012/042937) PCT International Search Report (PCT/ISA/210) dated Jun. 18, 2012.

(Continued)

*Primary Examiner* — Andrew Sue-Ako
(74) *Attorney, Agent, or Firm* — Boulware & Valoir (57) ABSTRACT

A method relates to improving production rate and recovery of heavy oil or bitumen and reducing heat loss to over and under burden in a steam-assisted production process. The method includes strategically injecting recycled carbon dioxide into the reservoir between production wells. The heat insulation and solvent effects provided by carbon dioxide dissolved in the oil phase facilitate the desired improvement on oil recovery, and simultaneously sequester the $CO_2$ back into the reservoir.

14 Claims, 6 Drawing Sheets

(56) References Cited

U.S. PATENT DOCUMENTS

| | | | |
|---|---|---|---|
| 4,327,805 A * | 5/1982 | Poston | E21B 43/24 166/272.1 |
| 4,617,993 A | 10/1986 | Brown | |
| 4,649,997 A | 3/1987 | Bousaid | |
| 4,982,786 A | 1/1991 | Jennings, Jr. | |
| 5,046,561 A | 9/1991 | Huang et al. | |
| 5,720,350 A | 2/1998 | McGuire | |
| 5,725,054 A | 3/1998 | Shayegi et al. | |
| 5,778,977 A | 7/1998 | Bowzer et al. | |
| 5,984,010 A | 11/1999 | Elias et al. | |
| 6,966,374 B2 | 11/2005 | Vinegar et al. | |
| 7,172,030 B2 * | 2/2007 | Horner et al. | 166/402 |
| 7,303,006 B2 | 12/2007 | Stone | |
| 7,562,708 B2 * | 7/2009 | Cogliandro et al. | 166/248 |
| 8,215,392 B2 * | 7/2012 | Rao | E21B 43/164 166/268 |
| 2003/0015458 A1 * | 1/2003 | Nenniger | C10G 1/04 208/428 |
| 2003/0141073 A1 | 7/2003 | Kelley | |
| 2006/0289157 A1 * | 12/2006 | Rao | E21B 43/164 166/268 |
| 2007/0193748 A1 * | 8/2007 | Ware | E21B 36/02 166/303 |
| 2009/0071648 A1 | 3/2009 | Hagen et al. | |
| 2010/0170453 A1 | 7/2010 | Betzer-Zilevitch | |
| 2010/0193188 A1 | 8/2010 | Betzer-Zilevitch | |

FOREIGN PATENT DOCUMENTS

| | | |
|---|---|---|
| WO | 2006113982 | 11/2006 |
| WO | 2010109184 | 9/2010 |

OTHER PUBLICATIONS

Bunks, C, et al., Multiscale Seismic Waveform Inversion, Geophysics, vol. 60, No. 5 (Sep.-Oct. 1995), pp. 1457-1473 (17 pgs).

* cited by examiner

RECYCLING $CO_2$ IN HEAVY OIL OR BITUMEN PRODUCTION

CROSS-REFERENCE TO RELATED APPLICATIONS

This application is a non-provisional application which claims benefit under 35 USC § 119(e) to U.S. Provisional Application Ser. No. 61/502,165 filed Jun. 28, 2011, entitled "Recycling $CO_2$ in Heavy Oil or Bitumen Production," which is incorporated herein in its entirety.

STATEMENT REGARDING FEDERALLY SPONSORED RESEARCH OR DEVELOPMENT

None.

FIELD OF THE INVENTION

A method relating to thermal production methods, such as steam-assisted gravity drainage (SAGD) and cyclic steam stimulation (CSS) production methods, which are improved by the injection of $CO_2$ at some distance from the production well(s). The advantage of this embodiment is demonstrated in a SAGD process, but is applicable to any thermal or steam assisted production process.

BACKGROUND OF THE INVENTION

Bitumen (colloquially known as "tar" due to its similar appearance, odor, and color) is a thick, sticky form of crude oil, so heavy and viscous (thick) that it will not flow unless heated or diluted with lighter hydrocarbons. Bituminous sands—colloquially known as oil sands (or tar sands)—contain naturally occurring mixtures of sand, clay, water, and bitumen and are found in extremely large quantities in Canada and Venezuela.

Conventional crude oil is normally extracted from the ground by drilling oil wells into a petroleum reservoir, allowing oil to flow into them under natural reservoir pressures, although artificial lift and techniques such as water flooding and gas injection are usually required to maintain production as reservoir pressure drops toward the end of a field's life. Because extra-heavy oil and bitumen flow very slowly, if at all, under normal reservoir conditions, oil sands must be extracted by strip mining or the oil made to flow into wells by in situ techniques that reduce the viscosity. Viscosity can be reduced by injecting steam, solvents, and/or hot air into the sands or by in situ combustion. Such processes can use more water and require larger amounts of energy than conventional oil extraction, although many conventional oil fields also require large amounts of water and energy to achieve good rates of production.

The use of steam injection to recover heavy oil has been in use in the oil fields of California since the 1950s. In Cyclic Steam Stimulation ("CSS") or "huff-and-puff" the well is put through cycles of steam injection, soak, and oil production. First, steam is injected into a well at a temperature of 300 to 340 degrees Celsius for a period of weeks to months. The well is then allowed to sit for days to weeks to allow heat to soak into the formation. Later, the hot oil is pumped out of the well, again for a period of weeks or months. Once the production rate falls off, the well is put through another cycle of injection, soak and production. This process is repeated until the cost of injecting steam becomes higher than the money made from producing the oil. The CSS method has the advantage that recovery factors are around 20 to 25% and the disadvantage that the cost to inject steam is high.

Steam Assisted Gravity Drainage (SAGD) is another enhanced oil recovery technology that was developed in the 1980s and fortuitously coincided with improvements in directional drilling technology that made it quick and inexpensive to do by the mid 1990s. In the SAGD process, two parallel horizontal oil wells are drilled in the formation, one about 4 to 6 meters above the other. Steam is injected into the upper well, possibly mixed with solvents, and the lower one collects the heated crude oil or bitumen that flows out of the formation, along with any water from the condensation of injected steam.

The basis of the SAGD process is that the injected steam forms a "steam chamber" that grows vertically and horizontally in the formation. The heat from the steam reduces the viscosity of the heavy crude oil or bitumen, which allows it to gravity drain into the lower wellbore. The steam and gases rise because of their low density compared to the heavy crude oil below, ensuring that steam is not produced at the lower production well.

The gases released, which include methane, carbon dioxide, and usually some hydrogen sulfide, tend to rise in the steam chamber, filling the void space left by the oil and, to a certain extent, forming an insulating heat blanket above the steam. The condensed water and crude oil or bitumen gravity drains to the lower production well and is recovered to the surface by pumps, such as progressive cavity pumps, that work well for moving high-viscosity fluids with suspended solids.

Operating the injection and production wells at approximately reservoir pressure eliminates the instability problems that plague all high-pressure steam processes and SAGD produces a smooth, even production that can be as high as 70% to 80% of oil in place in suitable reservoirs. The process is relatively insensitive to shale streaks and other vertical barriers to steam and fluid flow because, as the rock is heated, differential thermal expansion causes fractures in it, allowing steam and fluids to flow through. This allows recovery rates of 60% to 70% of oil in place, even in formations with many thin shale barriers.

Thermally, SAGD is twice as efficient as the older CSS process, and it results in far fewer wells being damaged by high pressure. Combined with the higher oil recovery rates achieved, this means that SAGD is much more economic than pressure-driven steam processes where the reservoir is reasonably thick.

Although having certain advantages, oil production techniques like SAGD and CSS also typically produce significant amounts of carbon dioxide. In an era of increasing concern over $CO_2$ production and global warming, methods of reducing the $CO_2$ footprint are thus desirable. Additionally, heat losses to over and under burdens have negative impact on economics or may even limit the applicability of thermal recovery processes. The heat loss problem is seldom directly dealt with and often shunned by resorting to a less effective and more time-consuming non-thermal recovery process.

Capturing and sequestering $CO_2$ in a geologic formation has been proposed to reduce the $CO_2$ emission that contributes to global warming. Additionally, co-injecting $CO_2$ and steam in oil wells to mobilize the heavy oil has been proposed. However, existing methodologies use $CO_2$ at or near the production well, which has disadvantages. First, $CO_2$ partial pressure will detrimentally affect the saturation temperature of the injected stream. Second, $CO_2$ as a noncondensable gas can provide some insulation and reduce heat loss to surroundings. However, when co-injected with steam, it tends to stay ahead of the steam chamber and hence limits the development of steam chamber.

Thus, what is needed in the art are better, more cost effective ways of improving oil recovery, and at the same time allowing sequestration of $CO_2$.

SUMMARY OF THE INVENTION

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The present embodiment takes advantage of both $CO_2$'s thermal insulation and its solvent effects. $CO_2$'s thermal insulation capability can reduce heat losses to over and under burdens, and $CO_2$'s solvent effect can reduce a hydrocarbon's viscosity. As the thermal front approaches, the hydrocarbon partially mobilized by dissolved $CO_2$ is an add-on to the production.

The general idea of the present embodiment includes first identifying an existing well or drilling a new well, which is referred to in this specification as the "target well," at the top of pay zone of an oil formation and at a distance, for example, 25-100 meters horizontally away from the production well. If there is more than one producer well, an ideal location of the target well might be midway between the producer wells at the top of the pay zone. If there are more than two producers, the target can be equidistant from the plurality of producers, but of course placement can vary according to subsurface and surface structures. Thus, the placement of the wells is quite variable and only roughly equidistant. The important features are that the $CO_2$ adequately penetrate the formation, contact the oil, and provide an insulating blanket around the steam chamber, yet not be co-injected with the steam, but be sufficiently separate therefrom as to prevent partial saturation or interfere with the formation of the steam chamber. Thus, in preferred embodiments, the $CO_2$ injection is commenced first, followed by steam injection, and the injection wells are some distance apart.

The target well is set to a pressure controlled at a pressure that is similar to the SAGD well pair but adjusted by depth. Carbon dioxide will then be injected first at a small positive pressure difference. Carbon dioxide injection will remain limited for a period of time, the length of which depending upon the mobility of oil and water in place. As the thermal front approaches the target well, heavy oil around the target will become more mobile and the injectivity will increase.

The following abbreviations are used herein:

| | |
|---|---|
| SAGD | Steam assisted gravity drainage |
| CSS | Cyclic steam stimulation |

As used herein "heavy oil" refers to crude oil with higher carbon number and thus higher molecular weights and viscosity.

"Steam-assisted production process" refers to oil production processes that utilize steam to heat the formation to reduce the viscosity thereof, thus increasing the production rate and amount. Steam-assisted production process may include SAGD, CSS and other processes known to a skilled person in the art, and can be combined with other enhanced oil recovery techniques.

"Recycled $CO_2$," refers to $CO_2$ that is not generated for the sole purpose of being injected to the formation, and may include $CO_2$ generated as a byproduct of generating the steam to be used in a steam-assisted production process. The $CO_2$ need not be pure, but can have other gases admixed therewith. However, greatly enriched $CO_2$ is preferred as this provides the most $CO_2$ sequestration. Preferably, the $CO_2$ is produced at or near the reservoir, as this minimizes costs and maximizes efficiency, e.g., as a byproduct of steam production (e.g., onsite burning of fuel to make steam). However, this is not an essential feature, and the $CO_2$ can also be transported to the site for injection.

DESCRIPTION OF EMBODIMENTS OF THE INVENTION

A novel method of recycling carbon dioxide to mobilize the oil in a formation and to insulate the formation to reduce heat loss. Unlike steam-$CO_2$ co-injection, this embodiment injects $CO_2$ at a distance from the primary wells. In a preferred embodiment, the target well is set at the top of pay zone of an oil formation and at a distance, for example, about 30 to 50 meters horizontally away from the production well. Distances can of course be varied, depending on the geology of the formation, more porosity and/or permeability allowing the $CO_2$ injection distance to increase.

$CO_2$ used for this injection can be either generated from a power, heating or steam generation process or produced with hydrocarbon. Alternatively, any excess $CO_2$ from any source can be used.

The pressure of the initial injection of $CO_2$ is preferably slightly larger than current reservoir pressure, i.e. the pressure at the formation. In a preferred embodiment, the pressure of the initial injection of $CO_2$ is at least at least 1-10% or 1%-5% or 1-3% greater than the current reservoir pressure. For example, if the current reservoir pressure is 3 MPa, the pressure of the initial $CO_2$ injection is at least 3.03 MPa. Somewhat higher pressures can also be used, although at some point the cost increases and pressure increases can themselves be problematic.

Even after the initial injection, the pressure of the injected $CO_2$ should preferably be maintained at a level greater than the pressure at the formation, so as to sustain the injectivity of $CO_2$ in the well. In other words, the pressure of injected $CO_2$ must be higher than the pressure at the formation, otherwise no $CO_2$ can be further injected because the pressure at the formation would be greater than the injected $CO_2$ and gases would flow out of the formation. In a preferred embodiment, the pressure of the injected $CO_2$ is maintained at a level at least 1-3% above the formation pressure. The monitoring of the pressure at the formation and the adjustment of the pressure of $CO_2$ injected should be apparent to persons skilled in the art, and thus is not discussed in detail here.

The method takes advantage of both $CO_2$'s solvent effects and its thermal insulation effects. Before thermal front approaches, $CO_2$ injected into the formation via the target well is significantly dissolved into the hydrocarbon due to low temperature in the cold formation while at the same time partially remains in the gas phase. The significant presence of $CO_2$ in the hydrocarbon phase reduces the hydrocarbon viscosity and makes the partially mobilized hydrocarbon more readily drainable to the producer when the thermal front approaches.

At the same time, the gaseous $CO_2$ will move to the top of the pay zone and provide insulation benefit to reduce heat loss to the over burden. By keeping heat inside the formation, the increased mobility and reduced viscosity of the heavy oil inside the formation can be sustained for a longer period of time, which in turn contributes to increase production rate of the heavy oil.

In preferred embodiments, the production and steam wells are horizontal, as with SAGD wells, and the target well is also horizontal, as this provides the most contact with a generally horizontal pay zone. However, wells can also be vertical or any other arrangement, as can the target well.

The following examples are illustrative only, and are not intended to unduly limit the scope of the invention.

Example 1: Simulation of $CO_2$ Injection

Figure 1:
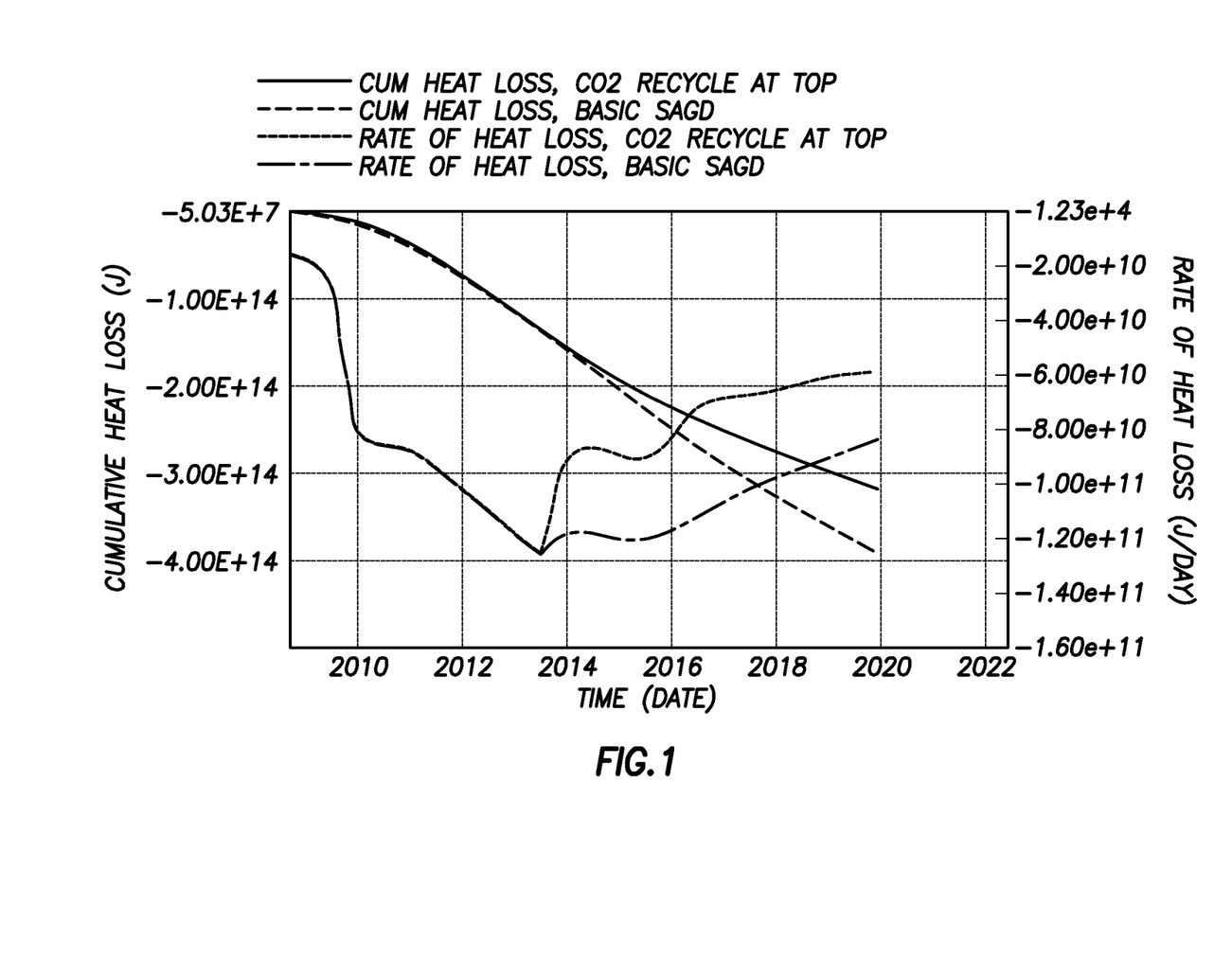
FIG. 1 is the simulated results of cumulative heat loss (left) and rate of heat loss (right) in Joules and Joules/day.
Figure 2:
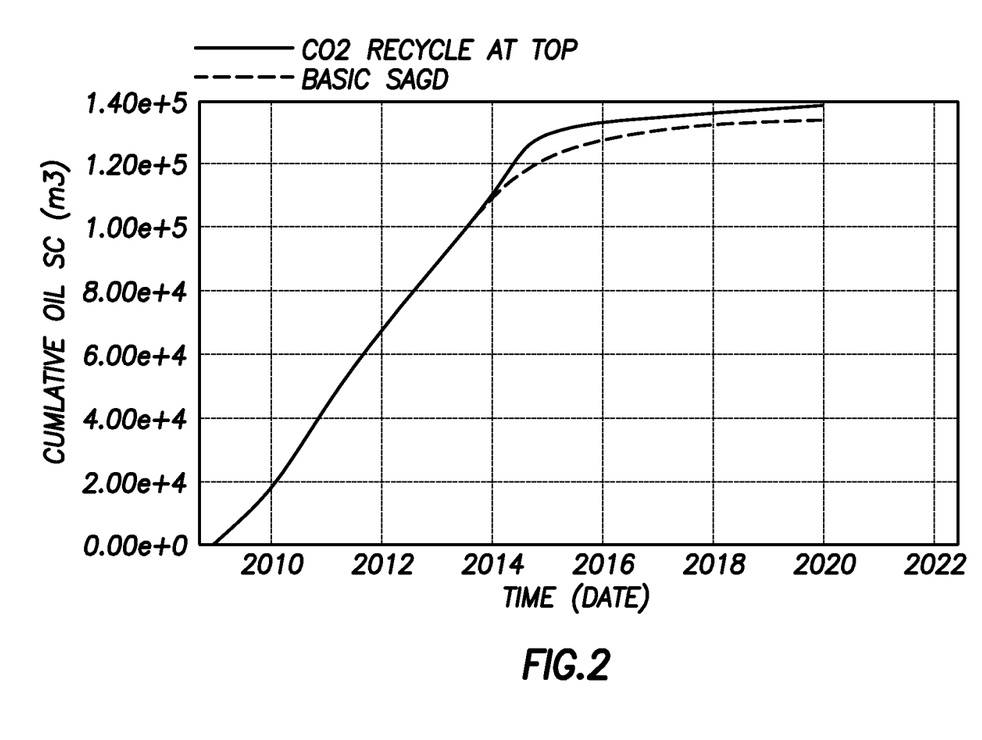
FIG. 2 is the cumulative oil production SC in $m^3$.
Figure 3:
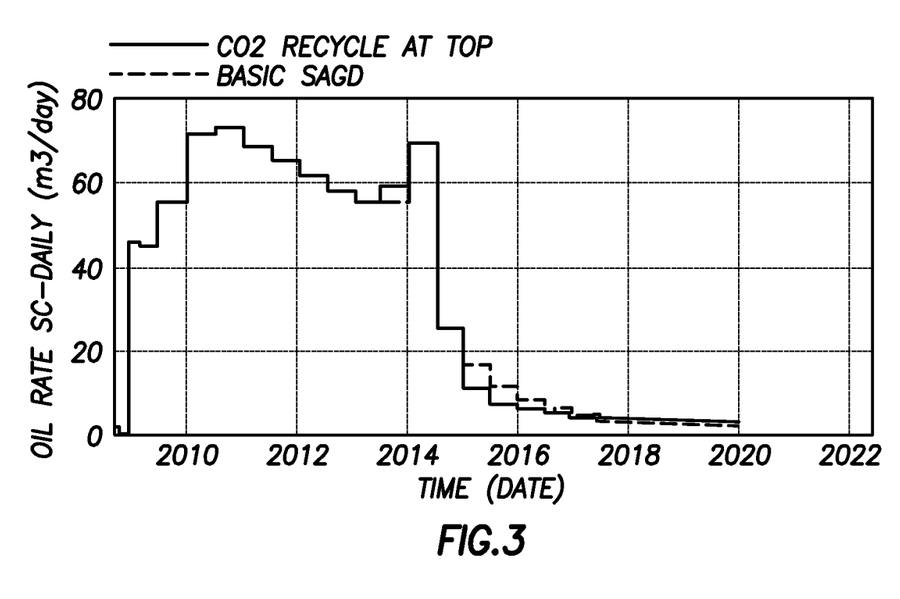
FIG. 3 is the simulated result of daily oil production in $m^3$/day.

The modeling work with CMG STARS, a commercial modeling software well accepted by the industry for thermal simulation, is shown in FIGS. 1, 2 and 3. The modeling assumes a horizontal target well that is 50 meters away from horizontal producer and steam injection well pair and at or near the top of the pay zone.

FIG. 1 is the simulated results using CMG STARS to predict the cumulative and rate of heat loss with or without using the method of the present embodiment.

As can be seen in FIG. 1, the rate of heat loss to over and under burdens in the case using the method of the present embodiment are reduced by about 20% as compared to conventional method. Additional efficiencies might be realized by sandwiching the steam injection well between a pair of target $CO_2$ injection wells, thus ensuring good insulating and solvating coverage of the pay zone by the injected $CO_2$.

Additionally, FIG. 2 shows the simulated results of oil recovery by using basic SAGD and by using the method of the present embodiment, which puts recycled $CO_2$ at the top of the formation and mobilizes the oil in the formation. As shown in FIG. 2, it is estimated that by using the method of the present embodiment, the recovery of oil can increase by 3-5% as compared to conventional method.

FIG. 3 shows the oil rate per day. Note that the production rate is not increased until after a period of time when the thermal front is approaching the over/under burdens and allows significant amount of $CO_2$ injection before the benefits are realized.

Figure 4:
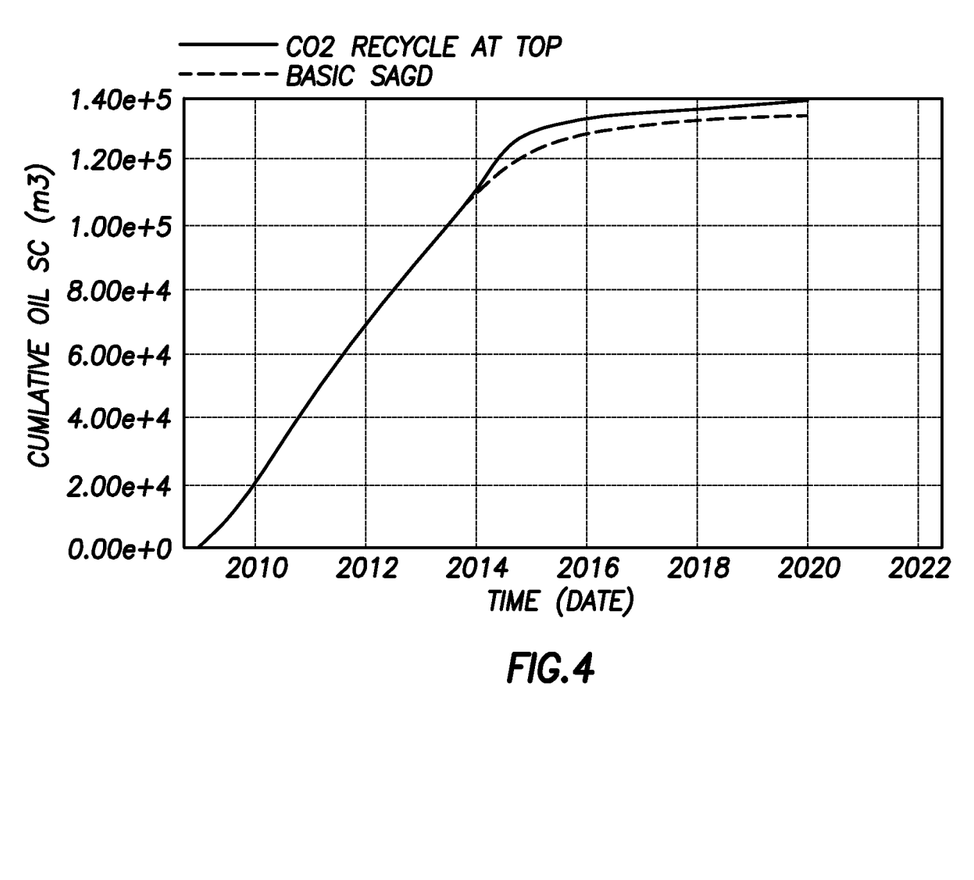
FIG. 4 is the simulation results of cumulative overall oil production.

FIG. 4 shows the cumulative oil production corresponding to FIG. 3. The overall increase in oil production was about 3.4% in this simulation.

Figure 5:
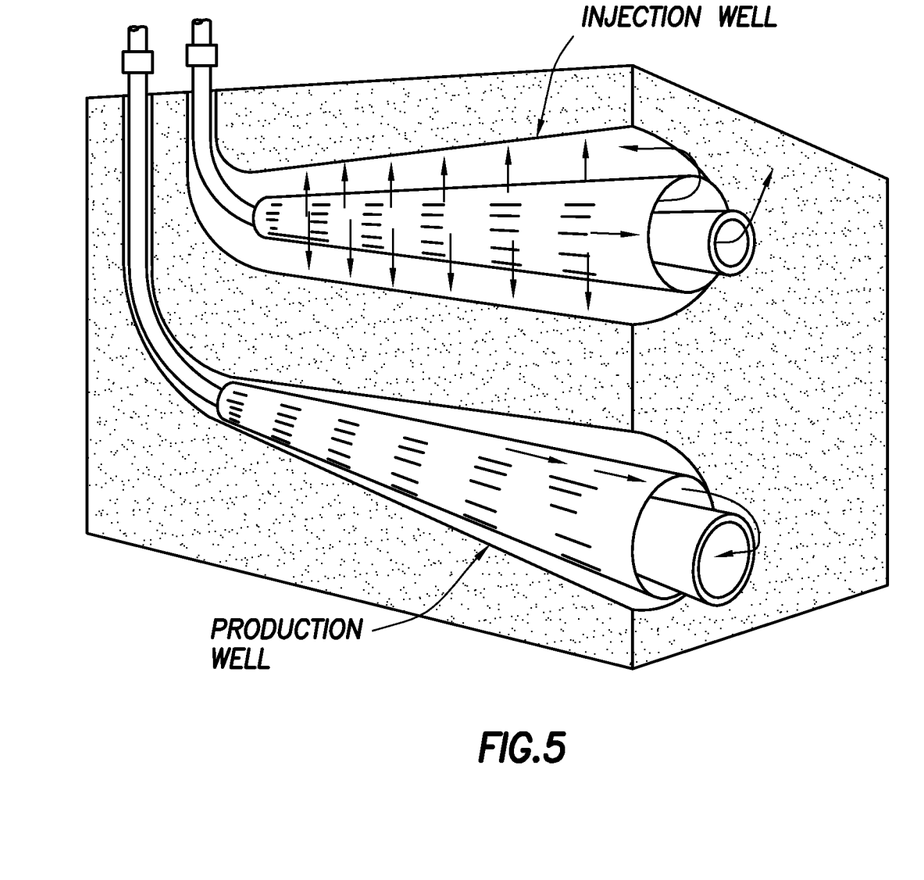
FIG. 5 is a 3D representation of a horizontal steam injection/production well arrangement for SAGD.
Figure 6:
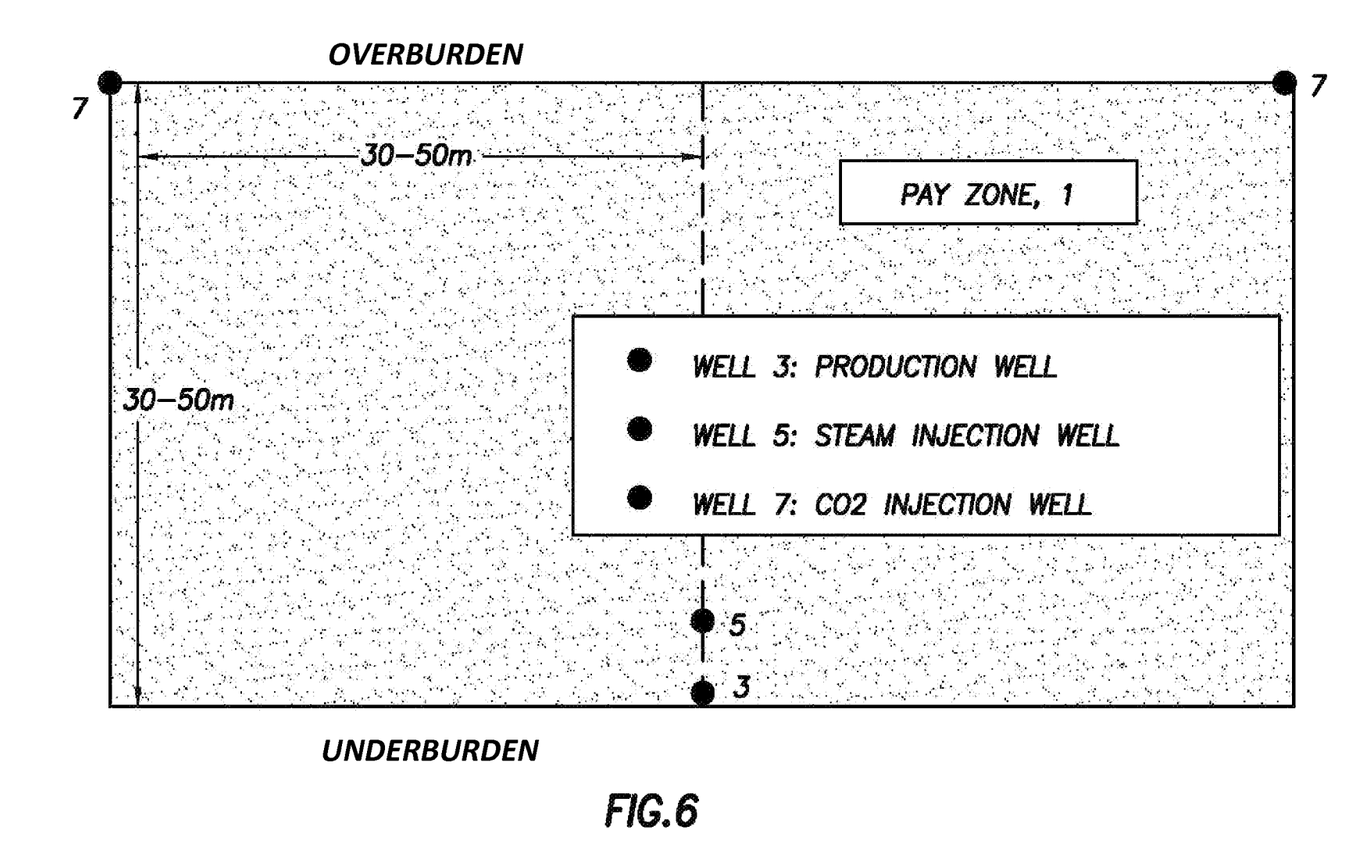
FIG. 6 is a cross section of two well arrangements of the embodiment, the top arrangement shows a single target $CO_2$ injection well, and a pair of SAGD wells are shown at the bottom.

FIG. 5 shows a typical horizontal SAGD injection/production well pair. FIG. 6 illustrates the wells in cross section, with the production well 3 at the bottom of pay zone 1, the steam injection well 5 above the producer 3 by 5 to 6 meters, and the CO2 injection well 7 some distance d from the well pair at the top of the pay zone.

The invention claimed is:

1. A method for improving production of heavy oil in a steam-assisted production process that has at least one production well in a hydrocarbon formation, comprising:
    a) providing a horizontal target well for injecting recycled carbon dioxide, wherein the target well is located at least 30 meters horizontally away from at least one production well and into a top of a pay zone in a bitumen or heavy oil reservoir wherein said pay zone is a bitumen or heavy oil pay zone;
    b) preparing the target well for injecting the recycled carbon dioxide;
    c) injecting the recycled carbon dioxide into said target well and said pay zone at an initial pressure that is at least 1% higher than an initial reservoir pressure, wherein said carbon dioxide adequately penetrates the bitumen or heavy oil, said carbon dioxide being significantly dissolved into the bitumen or heavy oil;
    d) injecting the recycled carbon dioxide at an increased pressure relative to reservoir pressure when a thermal front approaches the production well;
    e) the dissolved carbon dioxide making the bitumen or heavy oil more readily drainable to the producer as the thermal front approaches;
    f) wherein some of the injected carbon dioxide remains in the gas phase, said remaining gaseous carbon dioxide moving to the top of the pay zone to provide an insulating benefit and reducing heat loss to the over burden; and
    g) recovering said heavy oil or bitumen from said at least one production well.

2. The method of claim 1, wherein the steam-assisted production process comprises Steam Assisted Gravity Drainage (SAGD) or Cyclic Steam Stimulation (CSS).

3. The method of claim 1, wherein the target well is at least 50 meters horizontally away from the at least one production well.

4. The method of claim 1, wherein the recycled carbon dioxide is generated by boilers used in the steam-assisted production process.

5. The method of claim 1, wherein the initial pressure in step c) is 1-5% above the initial reservoir pressure.

6. The method of claim 1, wherein in step d) the injection pressure is maintained at 1-5% above the pressure of the hydrocarbon formation in order to sustain $CO_2$ injectivity.

7. A method for enhanced heavy oil recovery from a reservoir, comprising:
    a) combining steam assisted oil recovery with a $CO_2$ injection into a target well that is separate from a steam injection well and an oil production well, and at a horizontal distance away from said steam injection well and said oil production well, wherein said target well is located in a top of a pay zone in a heavy oil reservoir;
    b) injecting the $CO_2$ directly into the target well and thereby into a bitumen or a heavy oil in said pay zone, so that said $CO_2$ partially solvates the bitumen or the heavy oil in said pay zone and provides an insulating CO blanket over said steam injection well; and c) collecting bitumen or heavy oil from said oil production well, wherein said horizontal distance is 30-50 meters away from said oil production well and said steam injection well.

8. The method of claim 7, wherein said $CO_2$ is produced at or near said reservoir.

9. The method of claim 7, wherein said $CO_2$ is produced at or near said reservoir as a byproduct of producing steam.

10. The method of claim 7, wherein $CO_2$ injection pressure is maintained at 1-5% over a reservoir pressure.

11. The method of claim 7, wherein said $CO_2$ is continuously injected into said target well at a pressure that exceeds a pressure of said reservoir.

12. The method of claim 7, wherein said $CO_2$ is injected into said target well before and during a steam injection into said steam injection well.

13. The method of claim 7, wherein said target well is between a pair of oil production wells.

14. The method of claim 7, wherein there are a plurality of oil production wells and wherein said distance is at least 25 meters away from said plurality of oil production wells.

* * * * *